United States Patent
Sakata et al.

(10) Patent No.: US 10,443,693 B2
(45) Date of Patent: Oct. 15, 2019

(54) OPERATION DEVICE FOR LINK ACTUATING DEVICE

(71) Applicant: NTN CORPORATION, Osaka (JP)

(72) Inventors: Seigo Sakata, Iwata (JP); Yukihiro Nishio, Iwata (JP); Hiroshi Isobe, Iwata (JP); Naoya Konagai, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 220 days.

(21) Appl. No.: 15/614,038

(22) Filed: Jun. 5, 2017

(65) Prior Publication Data

US 2017/0268640 A1 Sep. 21, 2017

Related U.S. Application Data

(63) Continuation of application No. PCT/JP2015/083673, filed on Nov. 30, 2015.

(30) Foreign Application Priority Data

Dec. 5, 2014 (JP) .................. 2014-247017

(51) Int. Cl.
*F16H 21/48* (2006.01)
*B25J 13/06* (2006.01)
(Continued)

(52) U.S. Cl.
CPC ............ *F16H 21/48* (2013.01); *B25J 9/0048* (2013.01); *B25J 9/106* (2013.01); *B25J 9/1623* (2013.01);
(Continued)

(58) Field of Classification Search
CPC ......... F16H 21/48; B25J 9/0048; B25J 9/106; B25J 9/1623
See application file for complete search history.

(56) References Cited

U.S. PATENT DOCUMENTS 5,893,296 A * 4/1999 Rosheim .................. G05G 5/03
74/490.03
9,316,266 B2 * 4/2016 Isobe ........................ F16D 3/30
(Continued)

FOREIGN PATENT DOCUMENTS

JP 2005-279798 10/2005
JP 2006-142481 6/2006
(Continued)

OTHER PUBLICATIONS

English Translation of the International Preliminary Report on Patentability dated Jun. 15, 2017 in corresponding International Patent Application No. PCT/JP2015/083673.
(Continued)

*Primary Examiner* — David M Fenstermacher

(57) ABSTRACT

An operation device for a link actuating device (51) is provided with a target value input unit (57) having a height direction target value input portion (57z) that allows input of a movement amount in a height direction or a coordinate position in the height direction, which causes the distal end posture of the link actuating device (51) to be changed only in the height direction along a central axis of a proximal end side link hub (12). Input converter (58) is provided to calculate, by using an inputted value, a target distal end posture of the link actuating device (51). The Input converter (58) further calculates a command operation amount of each actuator (53) from the result of the calculation, and inputs the command operation amount to the control device (54).

10 Claims, 10 Drawing Sheets

(51) Int. Cl.
   *F16H 21/46* (2006.01)
   *B25J 9/10* (2006.01)
   *B25J 9/16* (2006.01)
   *G06F 3/03* (2006.01)
   *B25J 9/00* (2006.01)
   *F16C 19/22* (2006.01)

(52) U.S. Cl.
   CPC .............. B25J 13/06 (2013.01); F16H 21/46 (2013.01); G06F 3/0321 (2013.01); *B25J 9/108* (2013.01); *B25J 13/065* (2013.01); *F16C 19/22* (2013.01)

(56) References Cited

U.S. PATENT DOCUMENTS

| | | |
|---|---|---|
| 9,522,469 B2 | 12/2016 | Isobe et al. |
| 9,762,521 B2 * | 9/2017 | Chakra ................... H04L 51/18 |
| 10,065,310 B2 * | 9/2018 | Sakata ................... B25J 9/1623 |
| 2005/0159075 A1 * | 7/2005 | Isobe ................... B25J 17/0266 |
| | | 446/104 |
| 2005/0199085 A1 * | 9/2005 | Isobe ................... B25J 9/0048 |
| | | 74/490.05 |
| 2006/0287769 A1 * | 12/2006 | Yanagita ................ B25J 9/1669 |
| | | 700/245 |
| 2008/0028881 A1 * | 2/2008 | Sone ................... B25J 17/0266 |
| | | 74/471 R |
| 2011/0126660 A1 * | 6/2011 | Lauzier ................ B25J 17/0208 |
| | | 74/490.05 |
| 2012/0043100 A1 * | 2/2012 | Isobe ................... A61B 17/1631 |
| | | 173/42 |
| 2012/0053701 A1 * | 3/2012 | Yi ........................... B25J 9/0048 |
| | | 700/3 |
| 2013/0055843 A1 * | 3/2013 | Isobe ........................ F16C 1/02 |
| | | 74/490.04 |
| 2013/0192420 A1 * | 8/2013 | Isobe ..................... F16H 21/54 |
| | | 74/99 R |
| 2014/0224046 A1 * | 8/2014 | Isobe ..................... B25J 9/0048 |
| | | 74/89.14 |
| 2015/0088308 A1 | 3/2015 | Isobe et al. |

FOREIGN PATENT DOCUMENTS

| | | |
|---|---|---|
| JP | 2013-202725 | 10/2013 |
| JP | 2013-215864 | 10/2013 |

OTHER PUBLICATIONS

Office Action dated Aug. 21, 2018 in corresponding Japanese Patent Application No. 2014-247017, 11 pgs.
International Search Report dated Jan. 12, 2016 in corresponding International Application No. PCT/JP2015/083673.
Chinese Office Action dated Dec. 12, 2018 in corresponding Chinese Patent Application No. 201580065326.5, 6 pages.
Chinese Second Office Action dated Jul. 17, 2019 in corresponding Chinese Patent Application No. 201580065326.5 (Total 8 pages).

* cited by examiner

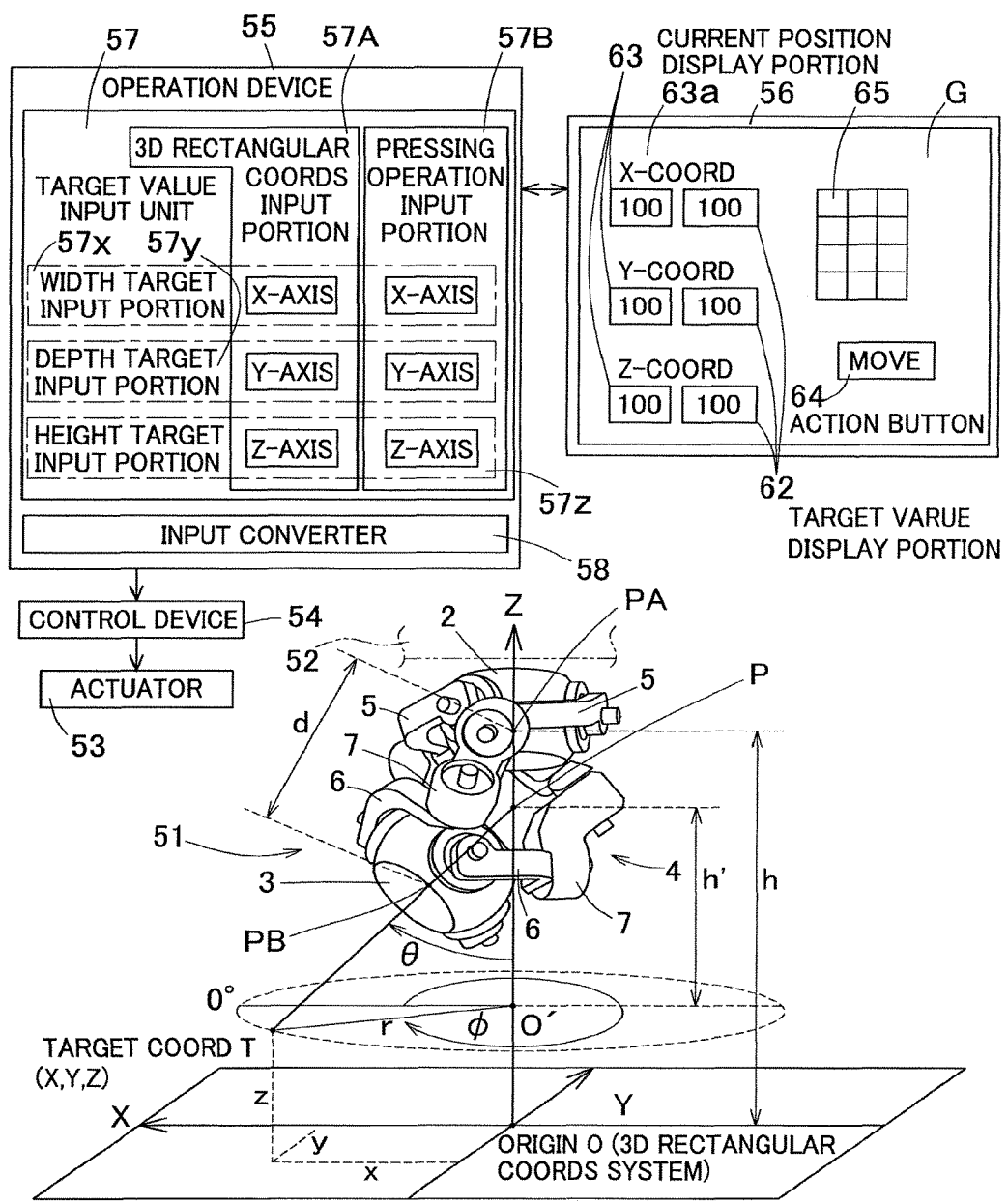

PRIOR ART

ARM ROTATION ANGLE A: $(\beta 1a)$

PRIOR ART

DISTAL END POSTURE OF LINK HUB A: $(\theta a, \phi a)$

ARM ROTATION ANGLE B: $(\beta 1b)$

PRIOR ART

DISTAL END POSTURE OF LINK HUB B: $(\theta b, \phi b)$

OPERATION DEVICE FOR LINK ACTUATING DEVICE

CROSS REFERENCE TO THE RELATED APPLICATION

This application is a continuation application, under 35 U.S.C. §111(a) of international patent application No. PCT/JP2015/083673, filed Nov. 30, 2015, which claims priority to Japanese patent application No. 2014-247017, filed Dec. 5, 2014, the entire disclosure of which is herein incorporated by reference as a part of this application.

BACKGROUND OF THE INVENTION

Field of the Invention

The present invention relates to an operation device for a link actuating device to be used in an apparatus, such as an industrial apparatus, that requires a precise and wide operating range. More particularly, the present invention relates to an operation device that can be effectively used when the link actuating device is used with an end effector being mounted to a distal end thereof.

Description of Related Art

Conventionally, as a parallel link mechanism of a link actuating device that has a compact structure but realizes a wide range of movement of a distal end side link hub, a parallel link mechanism 1 shown in FIGS. 10, 11A, and 11B has been suggested in which a distal end side link hub 3 is connected to a proximal end side link hub 2 via three or more link mechanisms 4 such that the posture of the distal end side link hub 3 can be changed relative to proximal end side link hub 2 (for example, Patent Document 1).

In such a link actuating device, the posture of a device that drives the two-degrees-of-freedom parallel link mechanism 1 by three or more motors is determined by a bend angle $\theta$ and an angle of swing $\phi$. That is, an rotation angle ($\beta 1n$, $\beta 2n$, $\beta 3n$) of each arm is obtained from the bend angle $\theta$ and the angle of swing $\phi$, and an actuator that drives the arm is caused to determine the position of the arm. For example, regarding a distal end posture A($\theta a$, $\phi a$) and a distal end posture B($\theta b$, $\phi b$) of a specific link hub 3, the arm rotation angles corresponding to the respective distal end postures are obtained as A($\beta 1a$, $\beta 2a$, $\beta 3a$) and B($\beta 1b$, $\beta 2b$, $3b$) according to a relational expression between the link hub and the arm rotation angles. Movement from the distal end posture A to the distal end posture B is executed by the respective arm rotation angles being changed from $\beta 1a$ to $\beta 1b$, from $\beta 2a$ to $\beta 2b$, and from $\beta 3a$ to $\beta 3b$. It is noted that in FIGS. 10 and 11, the same reference numerals are assigned to the portions corresponding to those shown in FIGS. 1 to 9 according to an embodiment of the present invention described later.

In Patent Document 1, from a rectangular coordinate system 100 which is set on an extension of the posture of the link actuating device, the distal end posture (bend angle $\theta$, angle of swing $\phi$) of the link hub 3 is obtained by using convergence calculation by the method of least squares. This enables positioning of an end effector to arbitrary coordinates on a work surface (rectangular coordinate plane) on which the end effector works.

RELATED DOCUMENT

Patent Document

[Patent Document 1] JP Laid-open Patent Publication No. 2013-202725

A target workpiece on which an end effector 122 works is not limited to a two-dimensional workpiece, and there are many applications in which an end effector works on a three-dimensional workpiece. Generally, three-dimensional coordinates (X, Y, Z) on which an end effector works can be easily calculated from CAD data or the like. When the end effector works on a three-dimensional workpiece, it is desirable that a position on which the end effector works can be designated by three-dimensional rectangular coordinates.

In the operation device for the link actuating device disclosed in Patent Document 1, designated rectangular coordinates are two dimensional coordinates (X axis, Y axis). Therefore, when the end effector is caused to work on a three-dimensional workpiece, an X coordinate and a Y coordinate projected on an XY plane at a certain reference height need to be calculated from a bend angle and a height Z, or teaching of each position needs to be performed by using pressing buttons such as X, Y axis jog buttons.

Since the jog button operation only allows a two-dimensional operation along the X and Y axes, if the height direction (Z axis direction) of the three-dimensional workpiece needs to be adjusted, it is difficult to understand the operation. Specifically, when a process such as coating is performed on a side surface of a cylindrical workpiece in a standing posture along the height direction, the end effector will be operated only in the up-down direction or vertical direction. Also when the end effector is moved only in the height direction, input is performed by a two-dimensional operation along the X and Y axes, and therefore, it is difficult to understand the operation.

SUMMARY OF THE INVENTION

An object of the present invention is to provide an operation device for a link actuating device, which allows input of an operation to change the distal end posture only in the height direction to be directly performed by input of a value in the height direction, facilitates input of a command of an operation to change the distal end posture only in the height direction, and realizes reduction in time for the input operation.

An operation device for a link actuating device according to the present invention will be described using reference numerals that are used in embodiments. This link actuating device includes: a proximal end side link hub 2; a distal end side link hub 3; and three or more link mechanisms 4 which each connect the distal end side link hub 3 to the proximal end side link hub 2 such that a posture of the distal end side link hub 3 can be changed relative to the proximal end side link hub 2. Each of the link mechanisms 4 includes: a proximal side end link member 5 having one end rotatably connected to the proximal end side link hub 2; a distal side end link member 6 having one end connected to the distal end side link hub 3; and an intermediate link member 7 having opposed ends rotatably connected to other ends of the proximal side end link member 5 and the distal side end link member 6, respectively. Each of the link mechanisms 4 has such a shape that a geometric model of the link mechanism 4 represented by straight lines shows symmetry between a proximal end side portion thereof and a distal end side portion thereof with respect to a center portion of the intermediate link member 7. Two or more link mechanisms 4 among the three or more link mechanisms 4 are each provided with an actuator 53 which changes a distal end posture that is the posture of the distal end side link hub 3 relative to the proximal end side link hub 2, and a control device 54 for controlling these actuators 53 is provided. The operation device for the link actuating device according to the present invention is an operation device 55 which inputs, through a human-induced operation, a target value to which the distal end posture is changed in the link actuating device 51.

The operation device 55 is provided with a target value input unit 57 having a height direction target value input portion 57z which allows input of a movement amount in a height direction or a coordinate position in the height direction, which causes the distal end posture to be changed only in the height direction along a central axis of the proximal end side link hub 2. Further, the operation device 55 is provided with input converter 58 which calculates, using a value inputted from the target value input unit 57, the distal end posture of the link actuating device which is represented by a bend angle θ and an angle of swing φ. The bend angle θ is a vertical angle foimied when a central axis of the distal end side link hub 3 is inclined relative to the central axis of the proximal end side link hub 2, and the angle of swing φ is a horizontal angle formed when the central axis of the distal end side link hub 3 is inclined relative to the central axis of the proximal end side link hub 2. The input converter 58 further calculates a command operation amount of each actuator 53 from the result of the above calculation, and inputs the command operation amount to the control device 54.

According to this configuration, the target distal end posture is designated through a human-induced operation by the target value input unit 57. At this time, regarding the height direction (Z axis direction), input of the movement amount in the height direction or the coordinate position in the height direction is performed through the height direction target value input portion 57z of the target value input unit 57 to designate a target height. Thus, the input converter 58 obtains, by using each value inputted from the target value input unit 57, the distal end posture represented by the bend angle θ and the angle of swing φ. The input converter 58 further calculates the command operation amount of each actuator 53 from the result of the calculation, and inputs the command operation amount to the control device 54. The control device 54 controls each actuator 53 in accordance with the inputted command operation amount so that the target distal end posture is achieved.

As described above, regarding the height direction, the height direction target value input portion 57z allows direct input of the movement amount or the coordinate position in the height direction. As compared with the conventional method of indirectly designating the height by using two-dimensional coordinates, an operator need not perform conversion, and therefore simple and speedy designation can be achieved. When the distal end posture is desired to be changed only in the height direction from the present posture, it is only necessary to input the movement amount or the coordinate position by the height direction target value input portion 57z. Thus, input of operation to change the distal end posture only in the height direction can be directly performed by a value in the height direction, whereby input of a command of operation to change the distal end posture only in the height direction can be easily performed, and the input operation time can be reduced.

In the present invention, the height direction target value input portion 57z may designate the movement amount in the height direction by an operation amount that depends on an operation time of a pressing button 85, 86 or the number of times the pressing button 85, 86. The pressing button 85, 86 may be a software key displayed as an image on a screen, or an operation button having a physical entity. According to this configuration, when being moved in the height direction, the distal end posture can be moved little by little in the height direction that is a direction in which the distal end posture is desired to be moved, by the number of times of operation or the operation time of the pressing button 85, 86. Therefore, intuitive teaching can be performed, and the operation of designating the height position is further facilitated.

If the movement amount by one ON operation of the pressing button 85, 86, and the movement amount to change the operation amount by pressing and holding the pressing button 85, 86 are set to arbitrary values by using movement amount parameters, adjustment of the operation amount by the pressing operation can be easily performed. The pressing button 85, 86 may be referred to as "JOG button", for example.

In the present invention, the target value input unit 57 may include a three-dimensional rectangular coordinate input portion 57A which inputs a coordinate position in each direction on a three-dimensional rectangular coordinate system having an origin positioned on the central axis of the proximal end side link hub 2. The phrase "on the central axis of the link hub" means "on the axis, having an infinite length, of the link hub".

Three-dimensional rectangular coordinates (X, Y, Z) of a three-dimensional workpiece on which an end effector 122 mounted to the distal end side link hub 3 works can be easily calculated from CAD data or the like. By inputting the three-dimensional coordinates (X, Y, Z) through the three-dimensional rectangular coordinate input portion 57A, the end effector 122 works on the inputted position, whereby teaching work by jog-feeding or the like is dispensed with. If positioning accuracy of the end effector 122 varies, teaching of minute adjustment is required. However, since rough positioning has been done, the time required for the teaching can be significantly reduced. When teaching is performed, intuitive teaching is realized by using the pressing buttons 81 to 84 corresponding to the X, Y axis directions in the three-dimensional rectangular coordinate system, and the pressing buttons 85 and 86 corresponding to the Z axis direction (the above-described height direction) in the three-dimensional rectangular coordinate system.

In the present invention, the input converter 58 may calculate the distal end posture of the link actuating device with the use of convergence calculation by the method of least squares, based on the value inputted through the target value input unit 57. According to the method of least squares, appropriate bend angle θ and angle of swing φ representing the distal end posture can be obtained by simple calculation.

In the present invention, assuming that a rotation angle of the proximal side end link member 5 relative to the proximal end side link hub 2 is βn, an angle formed between a first connection end axis of the intermediate link member 7 rotatably connected to the proximal side end link member 6 and a second connection end axis of the intermediate link member 7 rotatably connected to the distal side end link member 6 is γ, an angle of spacing, in a circumferential direction, of each proximal side end link member 5 relative to a proximal side end link member 5 that serves as a reference is δn, the bend angle is θ, and the angle of swing is φ, the input converter 58 performs inverse transformation of a formula expressed by $$\cos(\theta/2)\cdot\sin\beta n - \sin(\theta/2)\cdot\sin(\phi+\delta n)\cdot\cos\beta n + \sin(\gamma/2) = 0$$

to obtain a rotation angle of each proximal side end link member 5 in the distal end posture as a target, and calculates the command operation amount of each actuator 53 from a difference between the obtained rotation angle and the rotation angle of each proximal side end link member 5 in the distal end posture at present.

According to this method, the command operation amount can be easily obtained, and control of the actuator 53 is facilitated.

In the present invention, assuming that a rotation angle of the proximal side end link member 5 relative to the proximal end side link hub 2 is βn, an angle formed between a first connection end axis of the intermediate link member 7 rotatably connected to the proximal side end link member 5 and a second connection end axis of the intermediate link member 7 rotatably connected to the distal side end link member 6 is γ, an angle of spacing, in a circumferential direction, of each proximal side end link member 5 relative to a proximal side end link member 5 that serves as a reference is δn, the bend angle is θ, and the angle of swing is ϕ, the input converter 58 performs inverse transformation of a formula expressed by $$\cos(\theta/2)\cdot\sin\beta n - \sin(\theta/2)\cdot\sin(\phi+\delta n)\cdot\cos\beta n + \sin(\gamma/2) = 0$$

to form a table showing a relationship between the distal end posture and a rotation angle of each proximal side end link member 5, obtains, by using the table, a rotation angle of each proximal side end link member 5 in the distal end posture as a target, and calculates a command operation amount of each actuator 53 from a difference between the obtained rotation angle and the rotation angle of each proximal side end link member 5 at present.

According to this method, when the relationship between the distal end posture and each rotation angle of the proximal end side link hub 2 is tabulated in advance, the time required for calculating the command operation amount by using the above formula can be reduced, whereby control of the actuator 53 can be performed at higher speed.

In the present invention, when the target value input unit 57 includes the three-dimensional rectangular coordinate input portion 57A as described above, designation of the three-dimensional rectangular coordinate position may be performed by the three-dimensional rectangular coordinate input portion 57A of the target value input unit 57 with the use of numerical input. Besides the numerical input, designation of the three-dimensional rectangular coordinate position may be performed by input using the pressing operation input portion 57B or the like. However, since the three-dimensional rectangular coordinates (X, Y, Z) of the three-dimensional workpiece on which the end effector 122 works can be easily calculated from CAD data or the like as described above, designation of the three-dimensional rectangular coordinate position is effectively performed by numerical input in terms of simplification of input operation.

When designation of the three-dimensional rectangular coordinate position is performed by numerical input as described above, the target value input unit 57 may cause the three-dimensional rectangular coordinate input portion 57A to perform designation of the three-dimensional rectangular coordinate position with the use of numerical input of an absolute coordinate with respect to a predetermined reference point. When designation of the three-dimensional rectangular coordinate position is performed by numerical input of the absolute coordinate with respect to the predetermined reference point, the input is facilitated when the coordinate position of the absolute coordinate of the target distal end posture is known.

When designation of the three-dimensional rectangular coordinate position is performed by numerical input, the three-dimensional rectangular coordinate input portion 57A of the target value input unit 57 may be caused to perform designation of the three-dimensional rectangular coordinate position with the use of numerical input of a difference from a present coordinate position to a target coordinate position. When designation of the three-dimensional rectangular coordinate position is performed by numerical input of the difference, the input can be easily performed when the distal end side link hub 3 is slightly moved from the present distal end posture.

In the present invention, the input converter 58 may transform information of the distal end posture, which is provided from the target value input unit 57, into an operation amount of the actuator 53 according to a predetermined transformation formula, and input the operation amount to the control device 54. While the coordinate position of the three-dimensional rectangular coordinate position and the movement amount of the distal end posture are inputted from the target value input unit 57, the three-dimensional rectangular coordinate position of the distal end posture and the operation amount of the actuator 53 are in a relationship that depends on the structure of the link actuating device. Therefore, when the information of the distal end posture is converted into the operation amount of the actuator 53 with the use of the predetermined transformation formula, accurate control of the actuator 53 can be performed by inputting the three-dimensional rectangular coordinate position or the like through the target value input unit 57.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1 illustrates a perspective view of a parallel link mechanism in an operation device for a link actuating device, and an explanatory diagram showing a schematic configuration of an operation system and a control system, according to an embodiment of the present invention;

DESCRIPTION OF EMBODIMENTS

Figure 2A:
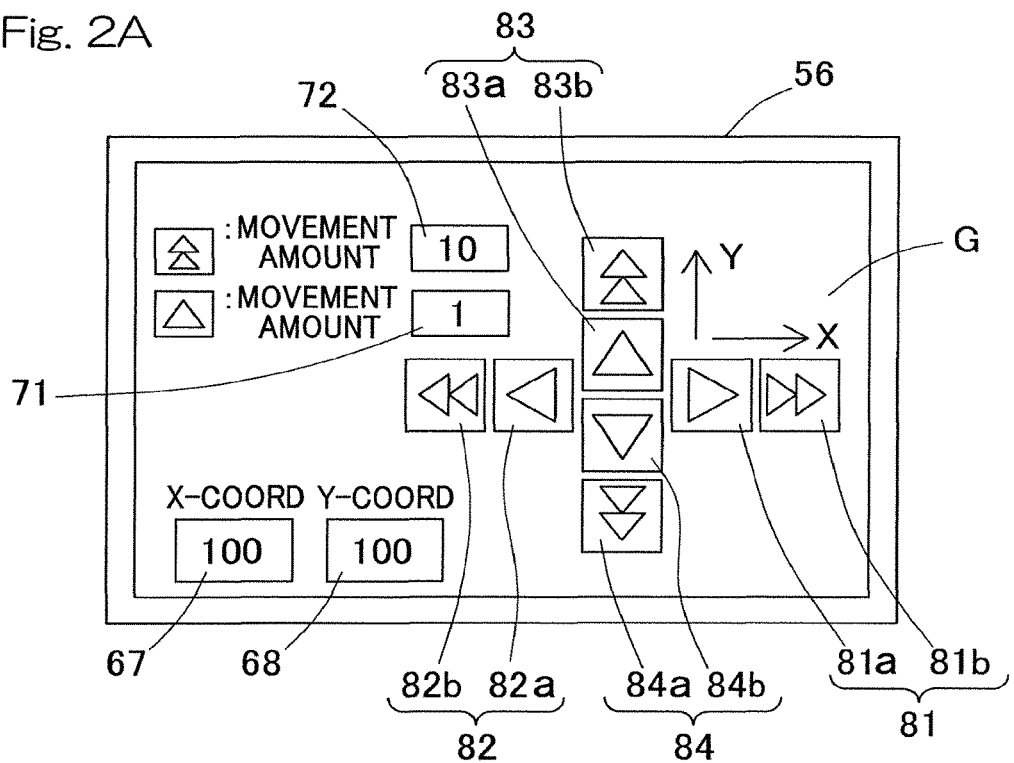
FIG. 2A is an explanatory diagram illustrating an XY coordinate jog input operation screen in the operation device for the link actuating device.

An operation device for a link actuating device according to an embodiment of the present invention will be described with reference to FIGS. 1 to 9. FIG. 1 shows a link actuating device provided with the operation device. The link actuating device 51 includes: a parallel link mechanism 1; a plurality of actuators 53 (as many as link mechanisms 4 described later) which arbitrarily change a distal end posture of the parallel link mechanism 1; a control device 54 which controls these actuators 53; and an operation device 55 through which an operation command is inputted to the control device 54. The control device 54 and the operation device 55 may be provided in a common casing to constitute a single controller (not shown), or may be provided separately from each other. The parallel link mechanism 1 is installed in a suspended manner to a base member 52.

Figure 5A:
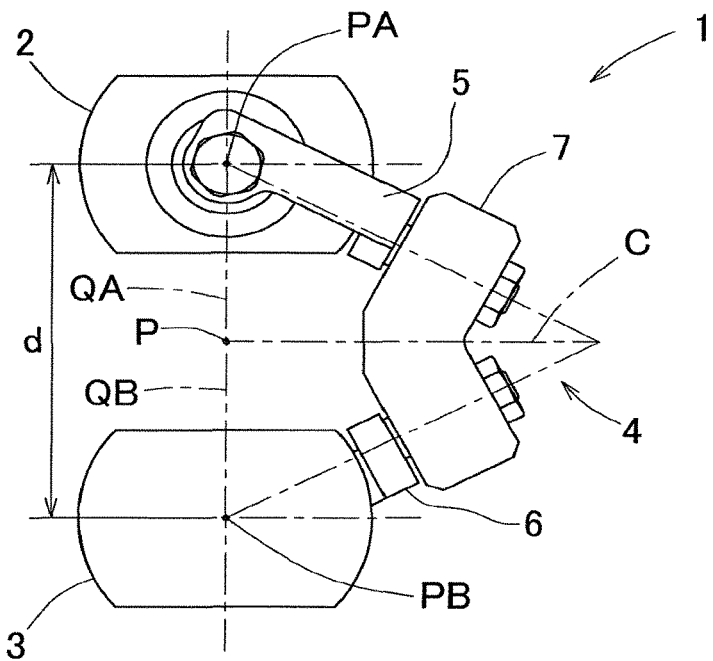
FIG. 5A is an explanatory diagram illustrating an operation of the link actuating device.
Figure 5B:
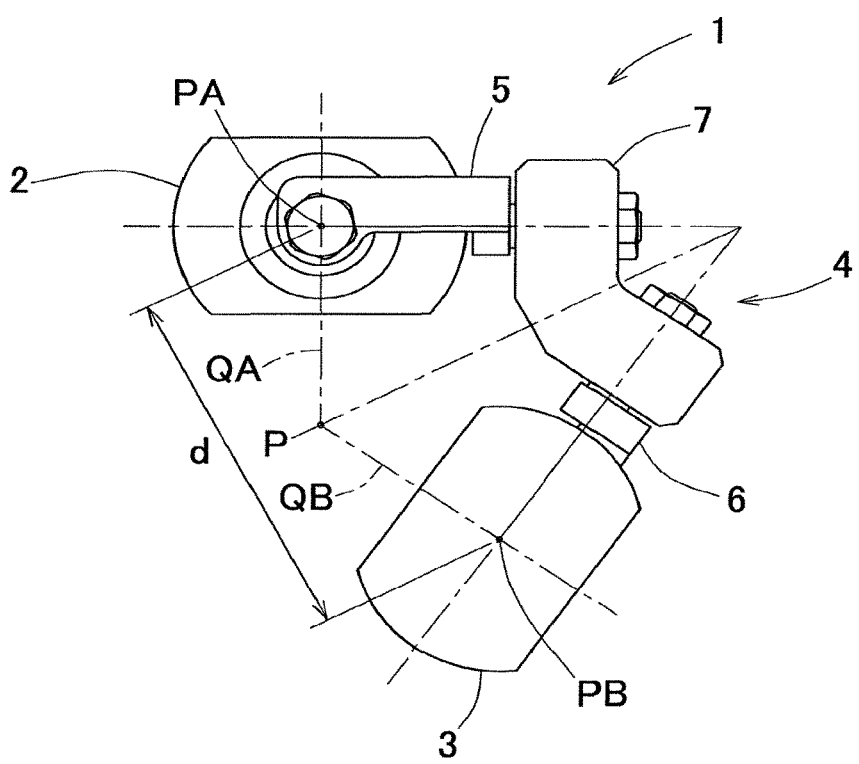
FIG. 5B is an explanatory diagram illustrating the operation of the link actuating device in a state different from FIG. 5A.
Figure 9:
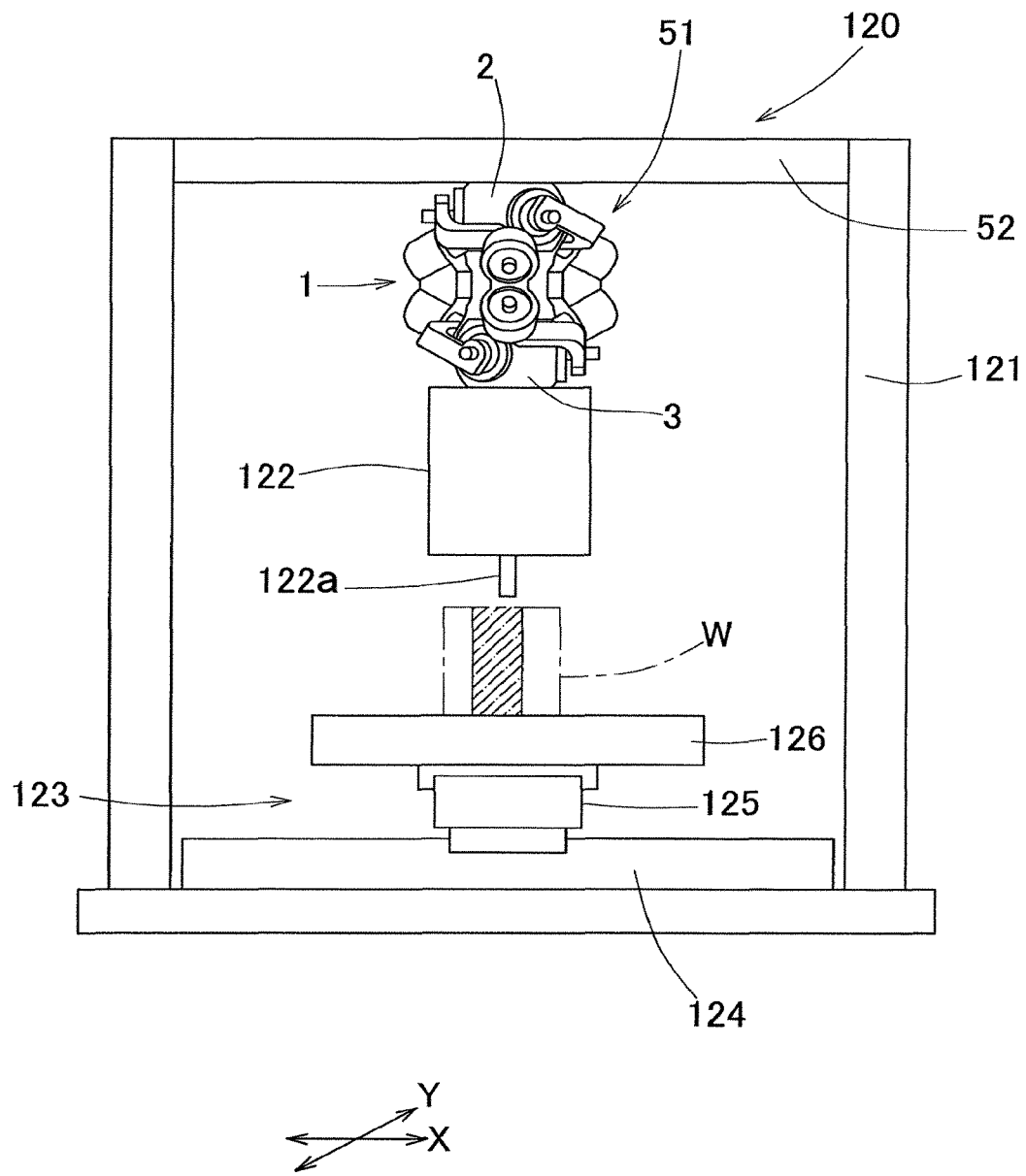
FIG. 9 is a front view of an example of a working device using the link actuating device.

The parallel link mechanism 1 will be described. FIG. 5A and FIG. 5B are front views of the parallel link mechanism 1 in different states. The parallel link mechanism 1 is of a type in which a distal end side link hub 3 is connected to a proximal end side link hub 2 via three link mechanisms 4 such that the posture of the distal end side link hub 3 can be changed relative to the proximal end side link hub 2. FIG. 5A and FIG. 5B show only one link mechanism 4. An end effector 122 is mounted to the distal end side link hub 3 as shown in FIG. 9.

Figure 3:
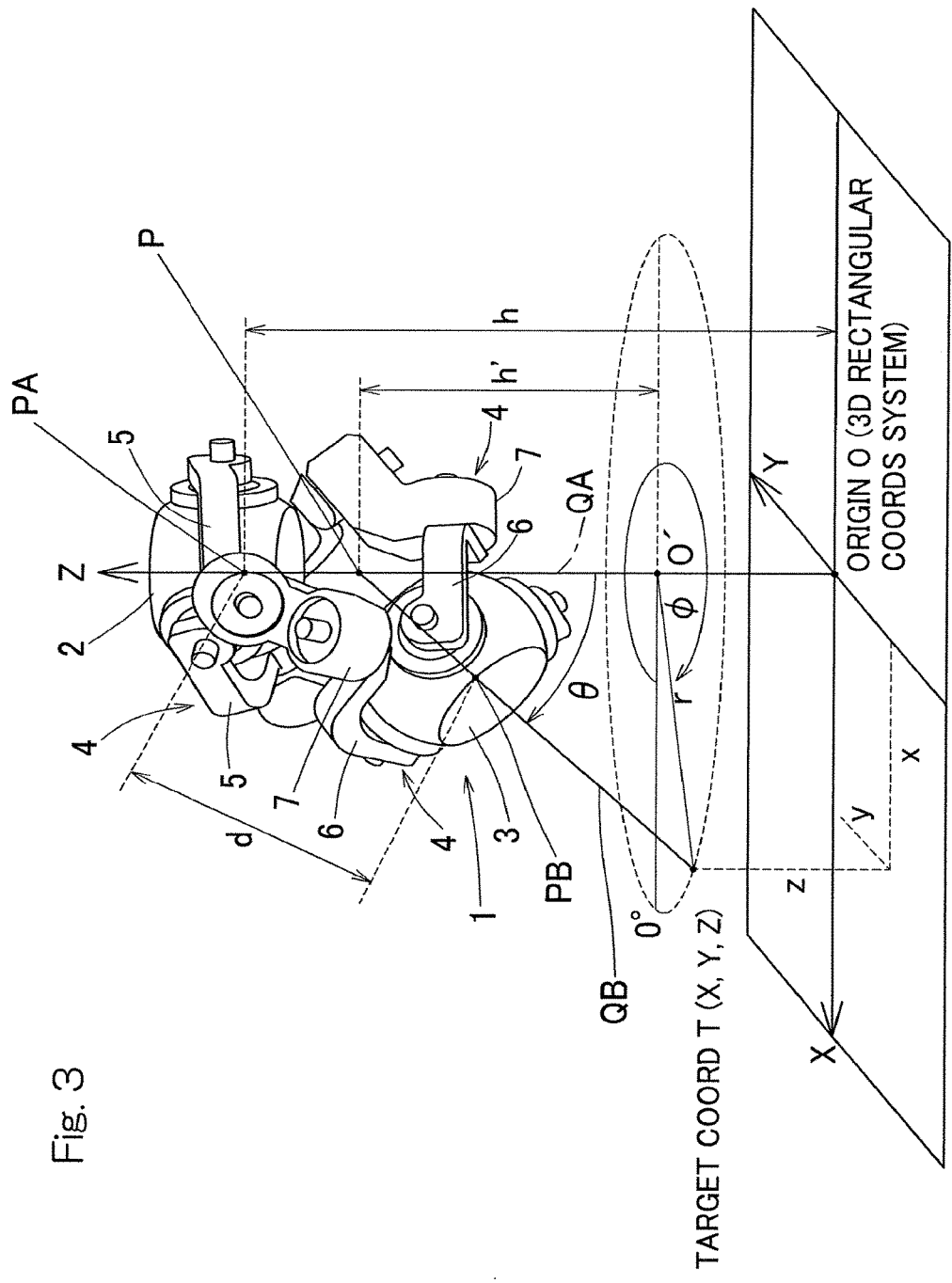
FIG. 3 is a perspective view of a parallel link mechanism in the link actuating device.

FIG. 3 is a perspective view showing a three-dimensional representation of the parallel link mechanism 1. The parallel link mechanism 1 shown in FIG. 3 is identical to the parallel link mechanism 1 shown in FIG. 10. Each link mechanism 4 includes a proximal side end link member 5, a distal side end link member 6 and an intermediate link member 7, and forms a triple link chain type link mechanism composed of four revolute pairs. The proximal side and distal side end link members 5 and 6 each have an L shape. The proximal end of the proximal side end link member 5 is rotatably coupled to the proximal end side link hub 2, and the proximal end of the distal side end link member 6 is rotatably coupled to the distal end side link hub 3. The intermediate link member 7 has its opposed ends rotatably coupled to the distal ends of the proximal side and distal side end link members 5 and 6, respectively.

The proximal side and distal side end link members 5 and 6 each have a spherical link structure. Spherical link centers PA and PB (FIG. 5A) are in common among the three link mechanisms 4, and a distance d between the spherical link centers PA and PB is also the same among the three link mechanisms 4. The central axis of the revolute pair between the proximal side end link member 5 and the intermediate link member 7 and the central axis of the revolute pair between the distal side end link member 6 and the intermediate link member 7 may form a certain crossing angle γ or may be parallel to each other.

Figure 6:
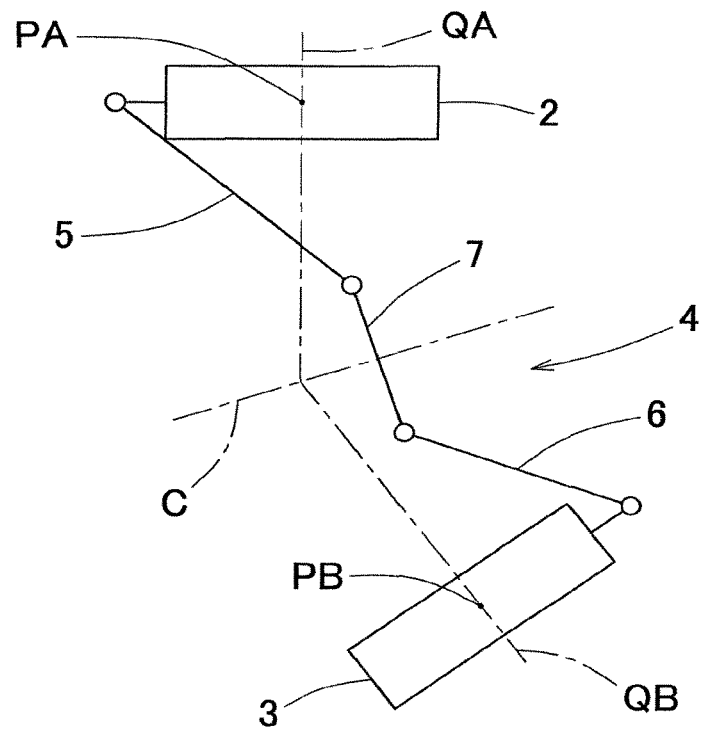
FIG. 6 is a schematic view of a link mechanism of the link actuating device, which is represented by straight lines.

The three link mechanisms 4 have a geometrically identical configuration. The geometrically identical configuration means that a geometric model depicted in straight lines representing the link members 5, 6, and 7, i.e., a model depicted with the revolute pairs and straight lines connecting these revolute pairs, represents a shape in which the proximal end side portion thereof and the distal end side portion thereof are symmetrical with each other with respect to the center portion of the intermediate link member 7. FIG. 6 shows one link mechanism 4 depicted in straight lines.

The link mechanism 4 in the present embodiment is of a rotation symmetrical type. That is, the positional relationship between a proximal group, composed of the proximal end side link hub 2 and the proximal side end link member 5, and a distal group, composed of the distal end side link hub 3 and the distal side end link member 6, is in rotation symmetry relative to a center line C of the intermediate link member 7. FIG. 5A shows a state where a central axis QA of the proximal end side link hub 2 and a central axis QB of the distal end side link hub 3 are on the same line. FIG. 5B shows a state where the central axis QB of the distal end side link hub 3 has a predetermined operating angle relative to the central axis QA of the proximal end side link hub 2. Even when the posture of each link mechanism 4 changes, the distance d between the proximal end side spherical link center PA and the distal end side spherical link center PB does not change.

The proximal end side link hub 2, the distal end side link hub 3, and the three link mechanisms 4 form a two-degrees-of-freedom mechanism in which the distal end side link hub 3 is rotatable in two axial directions orthogonal to each other, relative to the proximal end side link hub 2. In other words, the mechanism allows the distal end side link hub 3 to rotate with two degrees of freedom to change its posture, relative to the proximal end side link huh 2. In the two-degrees-of-freedom mechanism, the posture of the distal end side link hub 3 is changed relative to the proximal end side link hub 2, around an intersection P of the central axis QA of the proximal end side link hub 2, the central axis QB of the distal end side link hub 3 and the center line C of the intermediate link member 7.

The two-degrees-of-freedom mechanism is compact in size, but can realize a wide range of movement of the distal end side link hub 3 relative to the proximal end side link hub 2. For example, the maximum value of a bend angle θ (FIG. 3) (maximum bend angle) between the central axis QA of the proximal end side link hub 2 and the central axis QB of the distal end side link hub 3 can be about +90°. In addition, an angle of swing φ of the distal end side link hub 3 relative to the proximal end side link hub 2 can be set within a range of 0° to 360°. The bend angle θ means a vertical angle formed when the central axis QB of the distal end side link hub 3 is inclined relative to the central axis QA of the proximal end side link huh 2. The angle of swing φ means a horizontal angle formed when the central axis QB of the distal end side link hub 3 is inclined relative to the central axis QA of the proximal end side link hub 2.

In the parallel link mechanism 1, when all the following conditions 1 to 3 are satisfied, if the angular positional relationship between the intermediate link member 7 and the end link member 5 or 6 with respect to the symmetry plane of the intermediate link member 7 is made identical between the proximal end side and the distal end side, due to the geometrical symmetry, the proximal group and the distal group will move in the same manner.

(Condition 1) The angles and the lengths of shaft members 13 (FIG. 7) of the end link members 5 and 6 of each link mechanism 4 are identical to each other.

(Condition 2) The geometrical shape of the proximal side end link member 5 and the geometrical shape of the distal side end link member 6 are identical to each other.

(Condition 3) Also with respect to the intermediate link member 7, the shape on the proximal end side and the shape on the distal end side are identical to each other.

For example, rotation axes are provided in the proximal end side link hub 2 and the distal end side link hub 3, coaxially with the central axis QA and the central axis QB, respectively, and rotation is transmitted from the proximal end side to the distal end side. In this case, a constant velocity universal joint is formed in which the proximal end side and the distal end side are rotated by the same angle at an equal speed. The symmetry plane of the intermediate link member 7 at the time of this constant speed rotation is a constant velocity bisecting plane.

Therefore, by arranging, along the circumference, a plurality of the link mechanisms 4 having the same geometric shape in which the proximal end side link hub 2 and the distal end side link hub 3 are commonly used, as positions that allow compatible movement of the plurality of the link mechanism 4, the intermediate link members 7 are limited to move on their respective constant velocity bisecting planes. Accordingly, even when any operating angle is taken on the proximal end side and the distal end side, the proximal end side and the distal end side rotate at a constant speed.

Each of the proximal end side link hub 2 and the distal end side link hub 3 has a doughnut shape whose outer shape is spherical, in which a through-hole 10 (FIG. 7) is formed in a center portion thereof along the axial direction. The center of the through-hole 10 is aligned with the central axis QA, QB of the proximal/distal end side link hub 2, 3. The proximal side end link members 5 and the distal side end link members 6 are respectively rotatably coupled to the outer peripheral faces of the proximal end side link hub 2 and the distal end side link hub 3, at equal intervals in the circumferential direction thereof.

Figure 7:
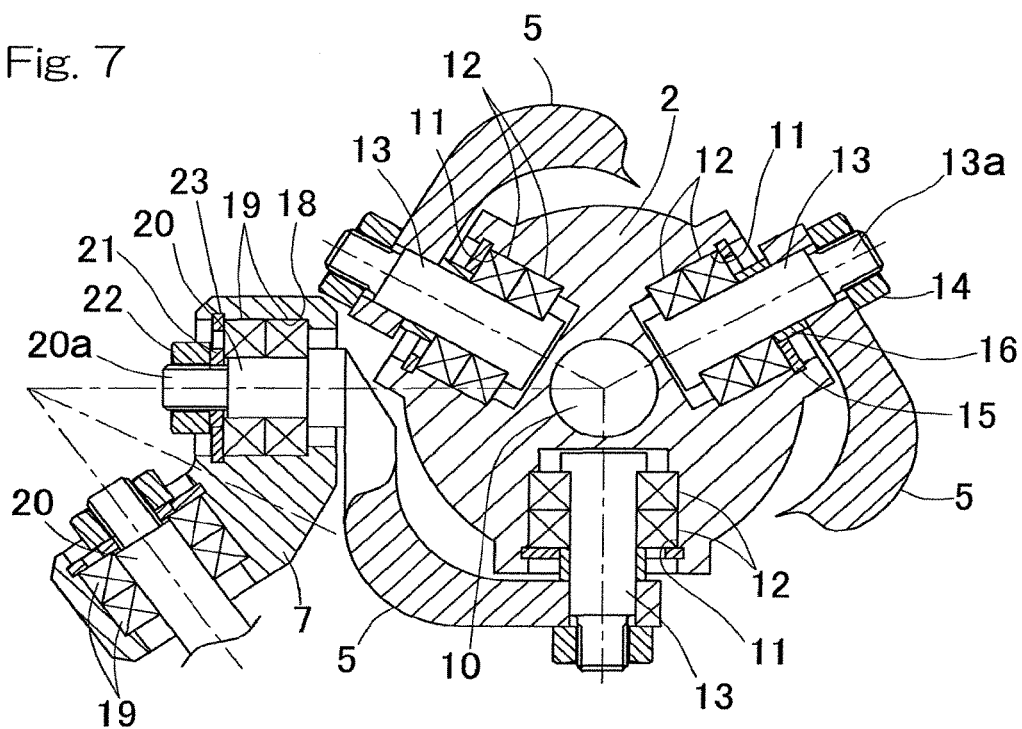
FIG. 7 is a partly sectional view of the parallel link mechanism of the link actuating device.

FIG. 7 is a cross-sectional view showing a revolute pair between the proximal end side link hub 2 and the proximal side end link member 5, and a revolute pair between the proximal side end link member 5 and the intermediate link member 7. In the proximal end side link hub 2, communication holes 11 extending in radial directions are formed at three positions in the circumferential direction of the proximal end side link hub 2. Two bearings 12 provided in each communication hole 11 rotatably support the shaft member 13. An outer end portion of each shaft member 13 protrudes from the proximal end side link hub 2, and a screw portion 13a is formed at the protruding end portion. The proximal side end link member 5 is coupled to the protruding end portion of the shaft member 13, and is fixed by fastening a nut 14 on the screw portion 13a.

Each bearing 12 is an antifriction bearing or rolling bearing such as a deep groove ball bearing, for example, and includes an outer ring (not shown) is fitted on the inner periphery of the communication hole 11 and an inner ring (not shown) fitted on the outer periphery of the shaft member 13. The outer ring is prevented from slipping off by a retaining ring 15. A spacer 16 is interposed between the inner ring and the proximal side end link member 5, and the fastening force of the nut 14 is transmitted to the inner ring via the proximal side end link member 5 and the spacer 16, thereby applying a predetermined preload to the bearing 12.

The revolute pair between the proximal side end link member 5 and the intermediate link member 7 will be described. Two bearings 19 are provided in a communication hole 18 formed on each of opposed ends of the intermediate link member 7, and a shaft portion 20 at the distal end of the proximal side end link member 5 is rotatably supported by these bearings 19. The bearings 19 are fastened and fixed with a nut 22 via a spacer 21.

Each bearing 19 is an antifriction bearing or rolling bearing such as a deep groove ball bearing, for example, and includes an outer ring (not shown) fitted on the inner periphery of the communication hole 18 and an inner ring (not shown) fitted on the outer periphery of the shaft portion 20. The outer ring is prevented from slipping off by a retaining ring 23. The fastening force of the nut 22 thread-engaged with a distal end screw portion 20a of the shaft portion 20 is transmitted to the inner ring via the spacer 21, thereby applying a predetermined preload to the bearing 19.

The revolute pair between the proximal end side link hub 2 and the proximal side end link member 5, and the revolute pair between the proximal side end link member 5 and the intermediate link member 7 have been described. However, the revolute pair between the distal end side link hub 3 and the distal side end link member 6, and the revolute pair between the distal side end link member 6 and the intermediate link member 7 have the same configuration as that described above (not shown).

As described above, in each link mechanism 4, the bearings 12 and 19 are provided in the four revolute pairs, i.e., the revolute pair between the proximal end side link hub 2 and the proximal side end link member 5, the revolute pair between the distal end side link hub 3 and the distal side end link member 6, the revolute pair between the proximal side end link member 5 and the intermediate link member 7, and the revolute pair between the distal side end link member 6 and the intermediate link member 7. Accordingly, frictional resistance in each revolute pair can be reduced, whereby rotational resistance can be reduced. Accordingly, smooth power transmission can be ensured and durability can be increased.

In the structure provided with the bearings 12, 19, by applying a preload to the bearings 12, 19, a radial clearance and a thrust clearance are eliminated and rattling of the revolute pair can be suppressed. As a result, rotation phase difference between the proximal end side link hub 2 side and the distal end side link hub 3 side is eliminated, and therefore, constant velocity can be maintained, and also, occurrence of vibration and abnormal sound can be suppressed. In particular, by providing the bearing clearance in each bearing 12, 19 as a negative clearance, backlash that occurs between input and output can be reduced.

By providing the bearings 12 in an embedded manner in the proximal end side link hub 2 and the distal end side link hub 3, it is possible to enlarge the outer shape of each of the proximal end side link hub 2 and the distal end side link hub 3, without enlarging the outer shape of the entire actuating device body 1. Accordingly, a mounting space for mounting the proximal end side link hub 2 and the distal end side link hub 3 to other members can be easily secured.

Figure 4:
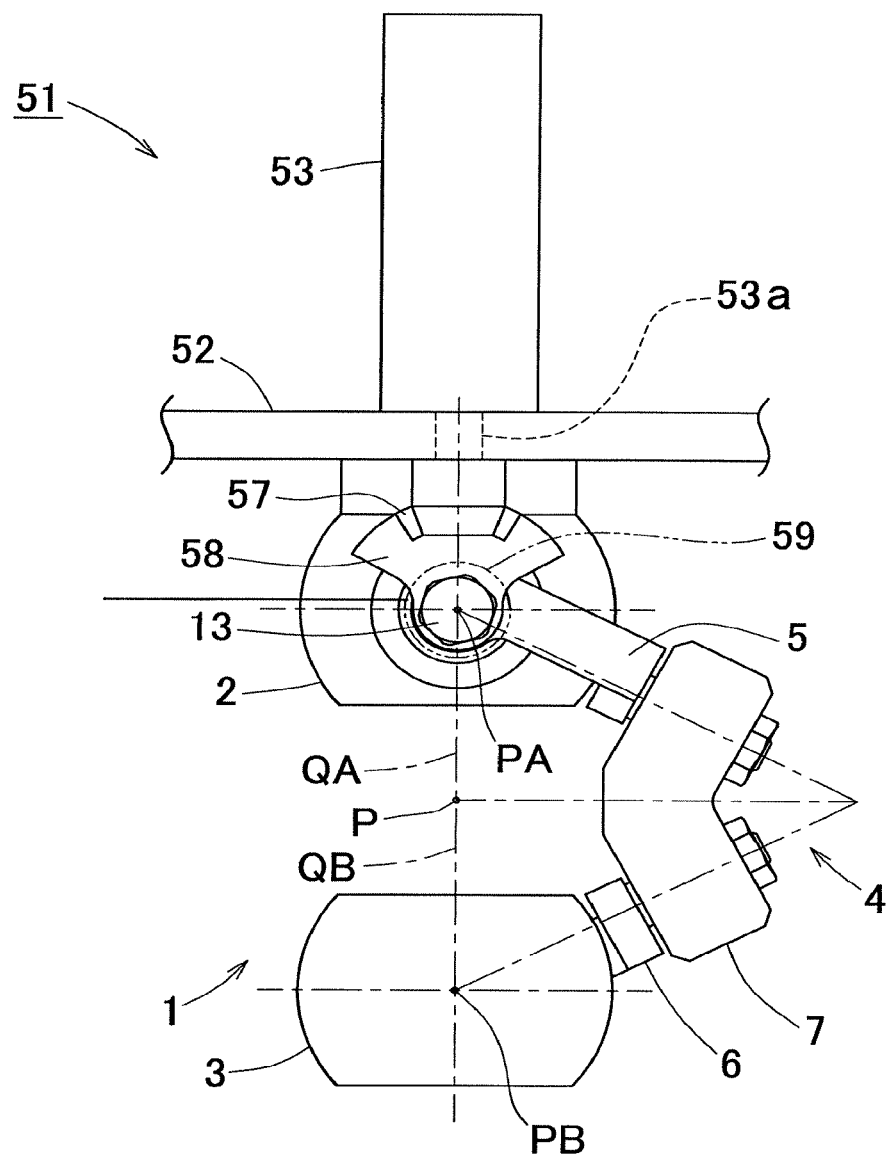
FIG. 4 is a partially omitted front view of the parallel link mechanism in the link actuating device.

In FIG. 4, in the parallel link mechanism 1, the proximal end side link hub 2 is fixed to the lower surface of the base member 52, and the distal end side link hub 3 is in a suspended state. On the upper surface of the base member 52, as many actuators 53 as the link mechanisms 4, i.e., three actuators 53 are mounted. Each actuator 53 is implemented by, for example, a motor or another rotary actuator. An output shaft 53a of each actuator 53 penetrates the base member 52 and protrudes downward, and a bevel gear 57 is mounted to the output shaft 53a. The bevel gear 57 is meshed with a bevel gear 58 having a sector shape and mounted on the shaft member 13 of the proximal end side link hub 2.

When the actuator 53 is rotated, its rotation is transmitted to the shaft member 13 via a pair of the bevel gears 57 and 58, whereby the angle of the proximal side end link member 5 relative to the proximal end side link hub 2 is changed. The operation amount of each actuator 53 is controlled to adjust the angle of the proximal side end link member 5 for each link mechanism 4, whereby the posture of the distal end side link hub 3 (hereinafter referred to as "distal end posture") relative to the proximal end side link hub 2 is determined. The operation of each actuator 53 is controlled by the control device 54 on the basis of an operation command from the operation device 55 shown in FIG. 1.

In FIG. 1, the operation device 55 is implemented by, for example, a panel type computer, and a display device 56 capable of displaying an image, such as a liquid crystal display device, is shown to the right of the operation device 55. The display device 56 may also serve as a touch panel type input device. The operation device 55 includes: a target value input unit 57 configured to input a target value of a distal end position; and an input converter 58. The input converter 58 need not necessarily be provided in a computer that implements the target value input unit 57, and may be provided in a computer that implements the control device 54.

Figure 2B:
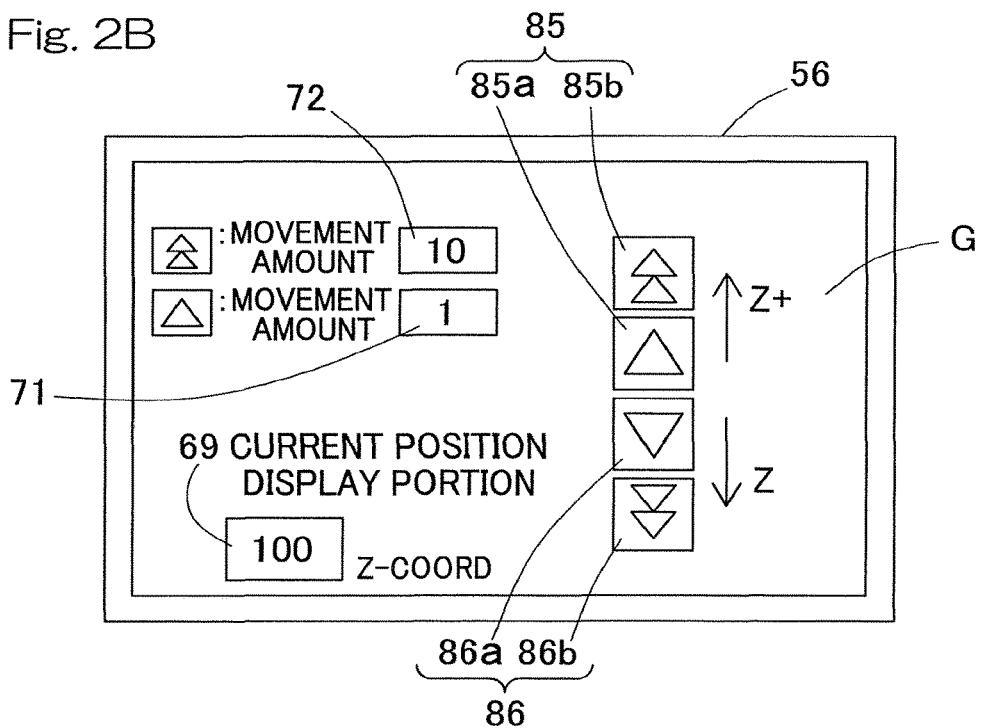
FIG. 2B is an explanatory diagram illustrating a Z coordinate jog input operation screen in the operation device for the link actuating device.

The target value input unit 57 is configured to designate and input a three-dimensional rectangular coordinate system, and includes: a width direction target value input portion 57x (width target input portion in FIG. 1), a depth direction target value input portion 57y (depth target input portion in FIG. 1), and a height direction target value input portion 57z (height target input portion in FIG. 1) which are configured to input target values of the respective axes (X axis, Y axis, Z axis). The target value input unit 57 is configured to be selectively operable in two input modes, namely, a three-dimensional rectangular coordinate input portion 57A which allows the coordinate positions of the respective axes to be inputted by numerical values, and a pressing operation input portion 57B which allows the coordinate positions of the respective axes to be designated by the pressing time or the number of times of operation of pressing buttons (jog buttons) 81 to 86 (FIGS. 2A and 2B). Input portions, with respect to the X axis, of the three-dimensional rectangular coordinate input portion 57A and the pressing operation input portion 57B are collectively referred to as a width direction target value input portion 57x. Likewise, input portions of these portions 57A and 57B with respect to the Y axis are collectively referred to as a depth direction target value input portion 57y, and input portions of these portions 57A and 57B with respect to the Z axis are collectively referred to as a height direction target value input portion 57z.

In the three-dimensional rectangular coordinate input portion 57A, the input portion corresponding to each axis causes a target value display portion 62 called an input box and a numerical value input button 65 such as a ten-key pad to be displayed on a screen G of the display device 56, and allows input of a target coordinate position when a numerical value to be displayed on the target value display portion 62 is designated by a screen touch operation onto the numerical value input button 65. Regarding the numerical input, a target coordinate position may be inputted through an input device (not shown) such as a hardware key, instead of the numerical value input button 65.

On the screen G, along with each numerical value input box 62, a current position display portion 63 and a guide display 63a are displayed by display output means (not shown) of the three-dimensional rectangular coordinate input portion 57A. Each current position display portion 63 displays the current position of each axis by a numerical value of a coordinate position, and each guide display 63a represents the axis direction, such as "X coordinate", corresponding to the current position display portion 63. The three-dimensional rectangular coordinate system is an arbitrary three-dimensional rectangular coordinate system having an origin on the central axis of the proximal end side link hub 2, and the Z axis direction thereof is referred to as a height direction.

On the screen G, an action button 64 is displayed. When this action button 64 is operated to turn on by screen touch or the like, each input value entered by the three-dimensional rectangular coordinate input portion 57A is converted into a command operation amount of each actuator 53 by the input converter 58, and the command operation amount is inputted to the control device 54. On the screen G, besides the above-mentioned items, an arrow button (not shown) to change the position of a cursor (not shown) indicating a position on the screen, a screen switching button (not shown) and the like are displayed.

The control device 54 drives each actuator 53 so that the actuator 53 moves by the command operation amount. The control device 54 feedback-controls each actuator 53 by using a detection signal from a position detector (not shown) such as a rotation angle sensor mounted to the actuator 53.

In the present embodiment, the three-dimensional rectangular coordinate input portion 57A of the target value input unit 57 adopts a method of inputting an absolute coordinate with respect to a given reference point (e.g., origin O) on a three-dimensional rectangular coordinate system, but may adopt a method of inputting a numerical value representing a difference from the current coordinate position to the target coordinate position. In addition, the target value input unit 57 is configured to be able to switch the display on the screen G between the input mode of performing input of coordinate positions shown in FIG. 1, and the input mode using the pressing buttons 81 to 86 which is shown in FIGS. 2A and 2B. The input mode using the pressing buttons will be described later.

In FIG. 1, the input converter 58 calculates the posture of the link actuating device 51, which is represented by the bend angle θ and the angle of swing ϕ, with the use of the values inputted by the target value input unit 57, then calculates the command operation amount of each actuator 53 from the result of the calculation, and inputs the command operation amount to the control device 54. The posture of the link actuating device 51 means the posture of the parallel link mechanism 1. The bend angle θ means a vertical angle formed when the central axis QB of the distal end side link hub 3 is inclined relative to the central axis QA (FIG. 3) of the proximal end side link hub 2. The angle of swing ϕ means a horizontal angle formed when the central axis QB of the distal end side link hub 3 is inclined relative to the central axis QA of the proximal end side link hub 2.

Figure 8:
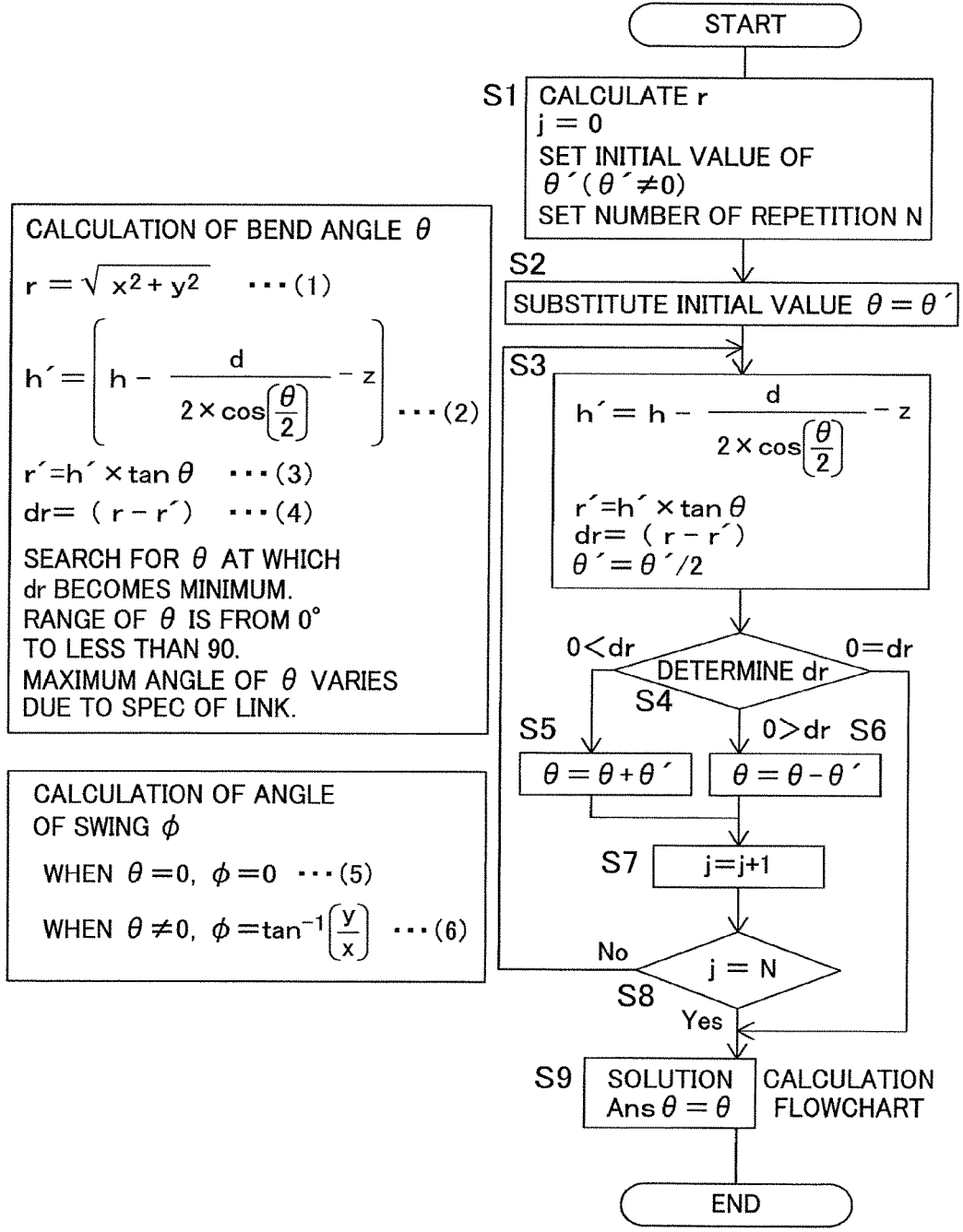
FIG. 8 is a flowchart of calculation for obtaining a bend angle in the operation device for the link actuating device.

FIG. 8 shows a calculation flowchart and calculation formulae for calculating, by the input converter 58, the posture (bend angle θ, angle of swing ϕ) of the distal end side link hub 3 from a three-dimensional rectangular coordinate system (XYZ plane coordinate system). The calculation shown in FIG. 8 is convergence calculation by the method of least squares. As shown in formula (1) of FIG. 8, assuming that the distance between an origin O' of a plane at a height Z and a target coordinate T (x, y, z) is denoted as "r", the distance r is obtained from x, y coordinates of the target coordinate T.

[Math 1]

$$r=\sqrt{x^2+y^2} \quad (1)$$

A height h' from the rotation center of the proximal end side link hub 2 to the target coordinate T can be expressed by the following formula (2) using the distance d between the centers of the link spherical surfaces, the height h from the reference plane to the center of the proximal end side link spherical surface, and the height z of the target coordinate T.

[Math. 2]

$$h' = \left(h - \frac{d}{2\times\cos\left(\frac{\theta}{2}\right)} - z\right) \quad (2)$$

In formula (2), variables d and h are fixed values determined by the link dimension and the device dimension. In addition, using the above formula (2), the distance between the origin O' and the target coordinate T can be calculated as variable r' according to a formula relating to θ, as shown in formula (3). Accordingly, as shown in formula (4), the bend angle θ is obtained by searching for a bend angle θ at which the difference between the distance r (calculated from x, y of the target coordinate T) and the distance r' (calculated from the bend angle θ) becomes minimum.

That is, with the following formulae (3) and (4), θ at which the difference dr becomes minimum is searched for.

[Math 3]

$$r'=h'\times\tan\theta \quad (3)$$

$$dr=(r-r') \quad (4)$$

The range of θ is from 0° to less than 90°, and the maximum angle varies depending on the specification of the link.

The calculation flowchart shown in FIG. 8 will be described. First, the distance r is calculated from formula (1) (step S1). Then, as initial setting for the calculation flow, the current number of times of repetition j is reset to zero, and an initial set value θ' in searching for the bend angle θ and the number of repetition of search N are set. For example, the initial set value θ' is set to a value half the maximum bend angle. When the value of the number of repetition N is greater, the precision of the bend angle θ finally obtained becomes higher, but the processing time of the calculation flow becomes longer. Therefore, the optimum number of repetition N should be determined on the basis of the relationship between the precision of the bend angle θ and the acceptable processing time.

Thereafter, θ=θ' is substituted (step S2), and the variables h', r', and dr are calculated as shown in formulae (2), (3), and (4), respectively. Then, θ'=θ'/2 is substituted (step S3).

Further, determination of the difference dr is performed in step S4. If 0<dr, θ=θ+θ' (step S5). If θ>dr, θ=θ−θ' (step S6).

Thereafter, the current number times of repetition j is incremented like j=j+1 (step S7). If 0=dr, θ=θ is obtained as a solution Ansθ (step S9).

If the current number of times of repetition j has not yet reached the set number of repetition N in step S8, the process returns to step S3. This flow is repeated until reaching the number of repetition N, and the finally obtained Ansθ is the desired bend angle θ. After the bend angle is obtained, the angle of swing is obtained as shown in formulae (5) and (6).

[Math 4]

When θ=0, φ=0 (5)

When θ ≠ 0, φ=tan$^{-1}$(y/x) (6)

According to the bend angle θ and the angle of swing φ obtained as described above, the target distal end posture is defined. As in the present embodiment, by obtaining the bend angle θ through convergence calculation by the method of least squares so as to search for the bend angle θ in order from the vicinity of the current coordinate position as a reference, the number of times of calculation can be reduced.

Figure 10:
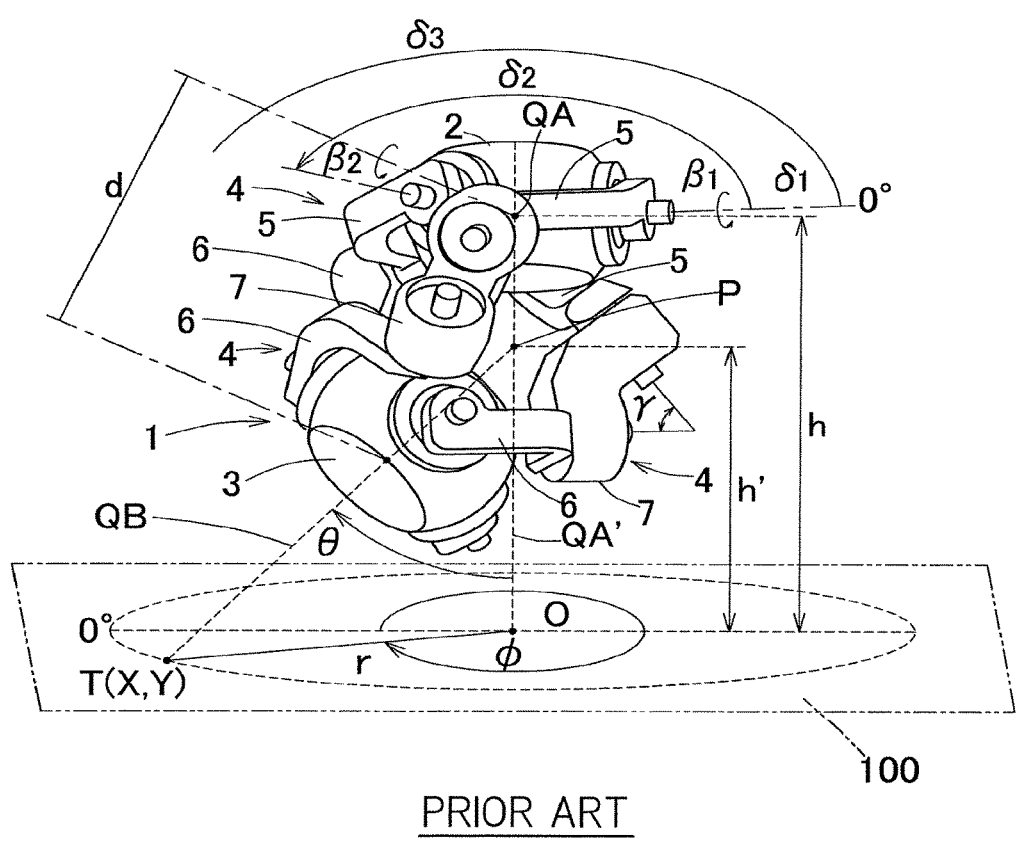
FIG. 10 is a perspective view of a parallel link mechanism in a conventional link actuating device.
Figure 11A:
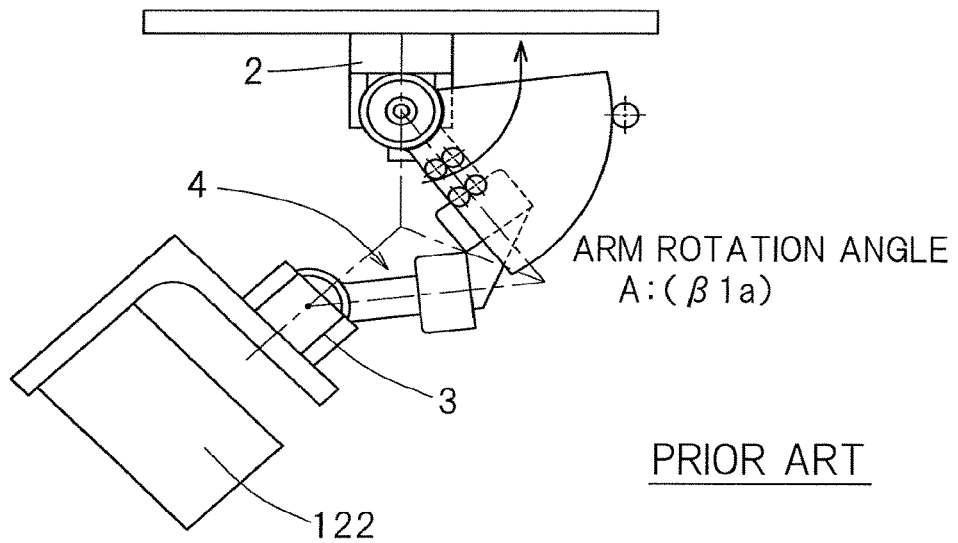
FIG. 11A is an explanatory diagram illustrating an operation of the parallel link mechanism.
Figure 11B:
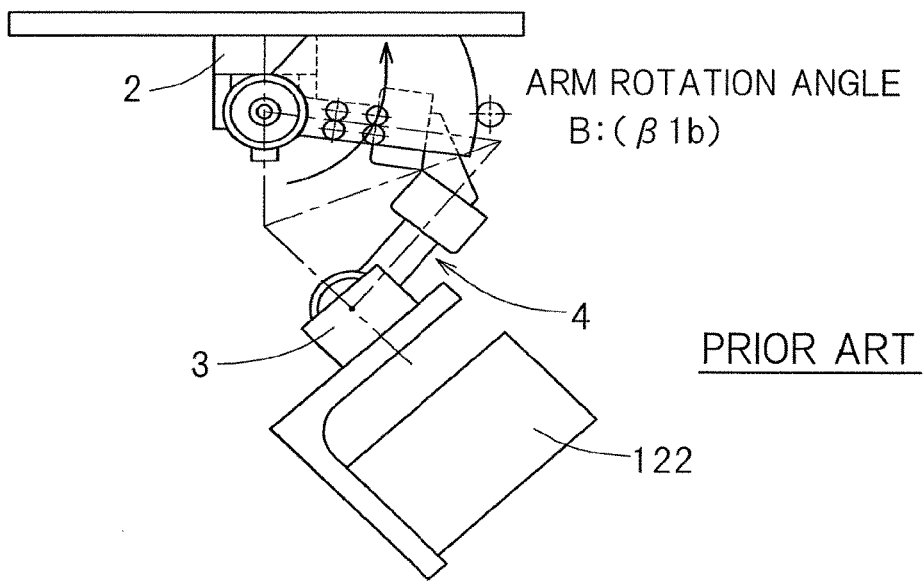
FIG. 11B is an explanatory diagram illustrating the operation of the parallel link mechanism in a state different from FIG. 11A.

The input converter 58 shown in FIG. 1 calculates, from the bend angle θ and the angle of swing φ obtained as described above, a rotation angle βn (n: 1 to 3) as a target angle at which each actuator 53 should be operated. The rotation angle βn is shown in FIG. 10 which shows the same parallel link mechanism 1 as in FIG. 3. The rotation angle βn is obtained, for example, by performing inverse transformation of the following formula (7). The inverse transformation is a transformation for calculating the rotation angle βn from the bend angle θ and the angle of swing φ. The bend angle θ and the angle of swing φ have a mutual relationship with the rotation angle βn, and from one value, the other value can be derived.

$$\cos(\theta/2)\cdot\sin\beta n-\sin(\theta/2)\cdot\sin(\phi+\delta n)\cdot\cos\beta n+\sin(\gamma/2)=0 \quad (7)$$

where n=1, 2, 3.

Here, variable γ (FIG. 1, FIG. 3) is the angle formed between the first connection end axis of the intermediate link member 7 rotatably connected to the proximal side end link member 5 and the second connection end axis of the intermediate link member 7 rotatably connected to the distal side end link member 6. Variable δn is the angle of spacing, in the circumferential direction, of each proximal side end link member 5 relative to a proximal side end link member 5 that serves as a reference.

The rotation angle βn may be obtained by inverse transformation of formula (7) for each command, but a table showing the relationship between the distal end position posture and the rotation angle βn, (such as Table 1 below), may be formed in advance. Such tabulation allows the target rotation angle βn to be obtained by using the table as soon as a command to change the distal end posture is made. Therefore, control of each actuator 53 can be performed at higher speed. When a pattern of commands is registered in advance and each actuator 53 is operated in order of the registered commands, a table showing the relationship between the distal end position posture and the rotation angle fan, (such as Table 2 below), is registered when the pattern is registered. By so doing, the storage area of the table can be saved.

TABLE 1

| Bend angle | Angle of swing | | | | | | | |
| --- | --- | --- | --- | --- | --- | --- | --- | --- |
| | 0 | 0.5 | 1.0 | 1.5 | 2.0 | 2.5 | 3.0 | 3.5 |
| 0 | β1 | β1 | β1 | β1 | β1 | β1 | β1 | β1 |
| | β2 | β2 | β2 | β2 | β2 | β2 | β2 | β2 |
| | β3 | β3 | β3 | β3 | β3 | β3 | β3 | β3 |
| 0.5 | β1 | β1 | β1 | β1 | β1 | β1 | β1 | β1 |
| | β2 | β2 | β2 | β2 | β2 | β2 | β2 | β2 |
| | β3 | β3 | β3 | β3 | β3 | β3 | β3 | β3 |
| 1.0 | β1 | β1 | β1 | β1 | β1 | β1 | β1 | β1 |
| | β2 | β2 | β2 | β2 | β2 | β2 | β2 | β2 |
| | β3 | β3 | β3 | β3 | β3 | β3 | β3 | β3 |
| 1.5 | β1 | β1 | β1 | β1 | β1 | β1 | β1 | β1 |
| | β2 | β2 | β2 | β2 | β2 | β2 | β2 | β2 |
| | β3 | β3 | β3 | β3 | β3 | β3 | β3 | β3 |
| 2.0 | β1 | β1 | β1 | β1 | β1 | β1 | β1 | β1 |
| | β2 | β2 | β2 | β2 | β2 | β2 | β2 | β2 |

TABLE 2

| Registration No. | Bend angle | Angle of swing | β1 | β2 | β3 |
| --- | --- | --- | --- | --- | --- |
| 1 | 0 | 0 | ... | ... | ... |
| 2 | 10 | 0 | ... | ... | ... |
| 3 | 12 | 20 | ... | ... | ... |
| 4 | 3 | 100 | ... | ... | ... |
| 5 | 25 | 50.2 | ... | ... | ... |
| 6 | 1.4 | 19 | ... | ... | ... |
| . | . | . | . | . | . |
| . | . | . | . | . | . |
| . | . | . | . | . | . |

FIG. 2A and FIG. 2B show examples of operation screens on which input for movement to a predetermined position is performed by means of the pressing buttons 81 to 86. FIG. 2A shows a jog operation screen for movement in the directions of the X and Y axes by portions, of the pressing operation input portion 57B, corresponding to the width direction target value input portion 57x and the depth direction target value input portion 57y shown in FIG. 1, respectively. The pressing buttons 81 to 84 and current value display portions 67 and 68 are displayed on the screen G. The current value display portions 67 and 68 indicates the X coordinate position and the Y coordinate position in the current coordinate position, respectively.

FIG. 2B is a jog operation screen for movement in the Z axis direction (height direction) by the height direction target value input portion 57z shown in FIG. 1. The pressing buttons 85 and 86 and a current value display portion 69 are displayed on the screen G. The current value display portion 69 indicates the Z coordinate position in the current coordinate position. Each of the pressing buttons 81 to 86 forms an operation unit, the operation amount of which varies depending on the operation time or the number of times of operation. Specifically, when each of the pressing buttons 81 to 86 is pressed and held (when the screen is touched and held), the operation amount is continuously increased. When each pressing buttons 81 to 86 is pressed for a very short time (when the screen is touched), the operation amount per pressing operation is constant, and the operation amount is increased by increasing the number of times of operation through repetition of the operation.

On each of the operation screen G for the X and Y axes (FIG. 2A) and the operation screen G for the Z axis (FIG. 2B), each of the pressing buttons 81 to 86 is provided such that different buttons are provided for positive and negative movement directions in the corresponding axis direction. Specifically, low-speed buttons 81a to 86a and high-speed buttons 81b to 86b are provided such that a pair of a low-speed button and a high-speed button is provided for input in the same movement direction in the same axis direction. By so doing, input of a command to change the posture can be performed in two rates, i.e., a low rate (the increase rate of the operation amount is low) and a high rate (the increase rate of the operation amount is high). Further, unit movement amount displays 71 and 72 showing the movement amounts by one short-time pressing operation on each of the low-speed buttons 81a to 86a and each of the high-speed buttons 81b to 86b, respectively, are provided on the screen G. Further, on the screen guides indicating: which coordinate, among X, Y, Z, each of the display portions of the pressing buttons 81 to 86 corresponds to; and which direction, between the positive direction and the negative direction, each of the display portions corresponds to are displayed by use of arrows or characters of X, Y, Z.

When a movement amount is inputted by using the pressing buttons 81 to 86 shown in FIG. 2A and FIG. 2B, the pressing operation input portion 57B of the target value input unit 57 shown in FIG. 1 gives, as a target coordinate position, a coordinate position obtained by adding the inputted movement amount (operation amount) to the current coordinate position, to the input converter 58. The input converter 58 calculates the distal end posture from the bend angle θ and the angle of swing φ as described above, and calculates the command operation amount of each actuator 53.

Specifically, regarding the height direction (Z axis), the target value input unit 57 calculates the height h' from the target coordinate T of the link hub according to formula (8) when the pressing button 85 is operated, and according to formula (9) when the pressing button 86 is operated.

[Math. 5]

$$h' = \left( h - \frac{d}{2 \times \cos\left(\frac{\theta}{2}\right)} - Z \right) \quad (8)$$

$$h' = \left( h - \frac{d}{2 \times \cos\left(\frac{\theta}{2}\right)} + Z \right) \quad (9)$$

In formula (8), a variable Z is a value that is displayed on the movement amount display portion 71 shown in FIG. 2B when the upward low-speed button 85a is pressed down, and is displayed on the movement amount display portion 72 when the upward high-speed button 85b is pressed down, and calculation is repeated for each set operation time.

In formula (9), a variable Z is a value that is displayed on the movement amount display portion 71 shown in FIG. 2B when the downward low-speed button 86a is pressed down, and displayed on the movement amount display portion 72 when the downward high-speed button 86b is pressed down, and calculation is repeated for each set operation time.

As described above, in the case of the operation using the pressing buttons 81 to 86 shown in FIG. 2A and FIG. 2B, X, Y and Z are sequentially changed by operating the pressing buttons 81 to 86, and a target bend angle θ and a target angle of swing φ are calculated. The operation amount of the actuator 53 according to the angles so calculated is determined. That is, the distal end posture continues to change while any of the pressing buttons 81 to 86 is pressed and held. Therefore, it is easy to understand the relationship between the operation and the coordinate position.

The pressing buttons 81 to 86 shown in FIG. 2A and FIG. 2B may be an operation device such as a joy stick.

The operation and effect of the present embodiment will be described. An arbitrary three-dimensional rectangular coordinate system existing within a range on an extension of the posture of the link actuating device 51 is designated, and from the three-dimensional rectangular coordinate system, the posture (bend angle $\theta$, angle of swing $\phi$) of the distal end side link hub 3 is automatically calculated, thereby to perform positioning of the link hub 3. In this case, the pressing buttons (jog buttons) 85 and 86 in the height direction (Z direction) and movement amount parameters thereof are added, and the posture (bend angle $\theta$, angle of swing $\phi$) of the link hub 3 is calculated from the current value and the movement amount based on the operation of the Z axis direction pressing buttons 85 and 86, thereby to perform positioning of the link hub 3. While the pressing buttons 85 and 86 are pressed down, the positioning operation is repeated to realize the jog function in the Z axis direction.

Three-dimensional rectangular coordinates (X, Y, Z) of a three-dimensional workpiece on which the end effector 122 (FIG. 9) works can be easily calculated from CAD data or the like. By registering the three-dimensional coordinates (X, Y, Z), the end effector 122 works on the registered position, and teaching by jog-feeding operation is dispensed with. When positioning accuracy of the end effector 122 varies, teaching of minute adjustment is needed. However, since rough positioning has been done, the time required for the teaching can be significantly reduced. When teaching is performed, intuitive teaching is realized by using the pressing buttons 81 to 84 in the X, Y axis directions and the pressing buttons 85 and 86 in the Z axis direction.

FIG. 9 shows a working device including the above-described link actuating device 51. In the working device 120, the link mechanism body 1 is installed in a suspended manner, with the proximal end side link hub 2 being fixed to a base member 52 constituting a ceiling of a work chamber 121. The end effector 122 is mounted to the distal end side link hub 3 of the link mechanism body 1. The end effector 122 is, for example, a coating machine.

Beneath the end effector 122, a movement mechanism 123 for moving a workpiece W in the X, Y axis directions is installed. The movement mechanism 123 includes: an X axis rail 124 which is fixed to a floor surface and is long along the X axis direction; a Y axis rail 125 which can advance/retract along the X axis rail 124 and is long along the Y axis direction; and a work table 126 which can advance/retract along the Y axis rail 125 and has an upper surface on which the workpiece is placed. The Y axis rail 125 and the work table 126 are moved in the X axis direction and the Y axis direction, respectively, by being driven by a drive source (not shown).

When the end effector 122 is a coating machine, the work table 126 is advanced/retracted in the X axis direction and the Y axis direction by the movement mechanism 123, thereby to locate a portion-to-be-coated of the workpiece W at a position directly beneath a paint jetting port 122a of the coating machine. In addition, by changing the distal end posture of the link actuating device 51, the orientation of the end effector 122 is changed so that the paint jetting port 122a faces the coating surface of the workpiece W all time.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, or its equivalent, to be construed as included therein.

REFERENCE NUMERALS

2 . . . proximal end side link hub
3 . . . distal end side link hub
4 . . . link mechanism
5 . . . proximal side end link member
6 . . . distal side end link member
7 . . . intermediate link member
51 . . . link actuating device
53 . . . actuator
54 . . . control device
56 . . . display device
57 . . . target value input unit
57A . . . three-dimensional rectangular coordinate input portion
57B . . . pressing operation input portion
57x . . . width direction target value input portion
57y . . . depth direction target value input portion
57z . . . height direction target value input portion
58 . . . input converter
62 . . . target value display portion
65 . . . numerical value input button
81 to 86 . . . pressing button
O . . . origin
QA . . . central axis of proximal end side link hub
QA' . . . extended axis
QB . . . central axis of distal end side link hub
$\theta$ . . . bend angle
$\phi$ . . . angle of swing

What is claimed is:

1. An operation device configured to operate a link actuating device, the link actuating device including:
  a proximal end side link hub;
  a distal end side link hub; and
  three or more link mechanisms which each connect the distal end side link hub to the proximal end side link hub such that a posture of the distal end side link hub can be changed relative to the proximal end side link hub, wherein
  each of the link mechanisms includes:
    a proximal side end link member having one end rotatably connected to the proximal end side link hub; a distal side end link member having one end connected to the distal end side link hub; and an intermediate link member having opposed ends thereof being rotatably connected to other ends of the proximal side end link member and the distal side end link member, respectively,
  each of the link mechanisms has such a shape that a geometric model of the link mechanism represented by straight lines shows symmetry between a proximal end side portion thereof and a distal end side portion thereof with respect to a center portion of the intermediate link member,
  two or more link mechanisms among the three or more link mechanisms are each provided with an actuator which changes a distal end posture that is the posture of the distal end side link hub relative to the proximal end side link hub, the link actuating device being provided with a control device configured to control the actuators, and the operation device being configured to input, through a human-induced operation, a target value to which the distal end posture is changed, the operation device comprising:

a target value input unit having a height direction target value input portion configured to allow input of a movement amount in a height direction or a coordinate position in the height direction, which causes the distal end posture to be changed only in the height direction along a central axis of the proximal end side link hub; and an input converter configured to calculate the distal end posture of the link actuating device by using a value inputted from the target value input unit, calculate a command operation amount of each actuator from a result of the calculation, and input the command operation amount to the control device, which distal end posture is represented by a bend angle and an angle of swing, the bend angle being a vertical angle formed when a central axis of the distal end side link hub is inclined relative to the central axis of the proximal end side link hub, the angle of swing being a horizontal angle formed when the central axis of the distal end side link hub is inclined relative to the central axis of the proximal end side link hub.

2. The operation device for the link actuating device as claimed in claim 1, wherein the height direction target value input portion designates the movement amount in the height direction by an operation amount that depends on an operation time of a pressing button, or a number of times the pressing button.

3. The operation device for the link actuating device as claimed in claim 1, wherein the target value input unit includes a three-dimensional rectangular coordinate input portion configured to input a coordinate position in each direction on a three-dimensional rectangular coordinate system having an origin positioned on the central axis of the proximal end side link hub.

4. The operation device for the link actuating device as claimed in claim 1, wherein the input converter calculates the distal end posture of the link actuating device with the use of convergence calculation by the method of least squares, based on the value inputted through the target value input unit.

5. The operation device for the link actuating device as claimed in claim 1, wherein assuming that a rotation angle of the proximal side end link member relative to the proximal end side link hub is $\beta n$, an angle formed between a first connection end axis of the intermediate link member rotatably connected to the proximal side end link member and a second connection end axis of the intermediate link member rotatably connected to the distal side end link member is $\gamma$, an angle of spacing, in a circumferential direction, of each proximal side end link member relative to a proximal side end link member that serves as a reference is $\delta n$, the bend angle is $\theta$, and the angle of swing is $\phi$, the input converter performs inverse transformation of a formula expressed by $$\cos(\nu/2)\cdot\sin \beta n - \sin(\theta/2)\cdot\sin(\phi+\delta n)\cdot\cos \beta n + \sin(\gamma/2) = 0$$

to obtain a rotation angle of each proximal side end link member in the distal end posture as a target, and calculates the command operation amount of each actuator from a difference between the obtained rotation angle and the rotation angle of each proximal side end link member in the distal end posture at present.

6. The operation device for the link actuating device as claimed in claim 1, wherein assuming that a rotation angle of the proximal side end link member relative to the proximal end side link hub is $\beta n$, an angle formed between a first connection end axis of the intermediate link member rotatably connected to the proximal side end link member and a second connection end axis of the intermediate link member rotatably connected to the distal side end link member is $\gamma$, an angle of spacing, in a circumferential direction, of each proximal side end link member relative to a proximal side end link member that serves as a reference is $\delta n$, the bend angle is $\theta$, and the angle of swing is $\phi$, the input converter performs inverse transformation of a formula expressed by $$\cos(\theta/2)\cdot\sin \beta n - \sin(\theta/2)\cdot\sin(\phi+\delta n)\cdot\cos \beta n + \sin(\gamma/2) = 0$$

to form a table showing a relationship between the distal end posture and a rotation angle of each proximal side end link member, obtains, by using the table, a rotation angle of each proximal side end link member in the distal end posture as a target, and calculates the command operation amount of each actuator from a difference between the obtained rotation angle and the rotation angle of each proximal side end link member at present.

7. The operation device of the link actuating device as claimed in claim 3, wherein designation of a three-dimensional rectangular coordinate position is performed by the three-dimensional rectangular coordinate input portion of the target value input unit with the use of numerical input.

8. The operation device for the link actuating device as claimed in claim 7, wherein the target value input unit causes the three-dimensional rectangular coordinate input portion of the target value input unit to perform designation of the three-dimensional rectangular coordinate position with the use of numerical input of an absolute coordinate with respect to a predetermined reference point.

9. The operation device for the link actuating device as claimed in claim 7, wherein the target value input unit causes the three-dimensional rectangular coordinate input portion of the target value input unit to perform designation of the three-dimensional rectangular coordinate position with the use of numerical input of a difference from a present coordinate position to a target coordinate position.

10. The operation device for the link actuating device as claimed in claim 1, wherein the input converter converts information of the distal end posture, which is provided from the target value input unit, into an operation amount of the actuator by using a predetermined transformation formula, and inputs the operation amount to the control device.

* * * * *

UNITED STATES PATENT AND TRADEMARK OFFICE
CERTIFICATE OF CORRECTION

PATENT NO. : 10,443,693 B2
APPLICATION NO. : 15/614038
DATED : October 15, 2019
INVENTOR(S) : Seigo Sakata et al.

Page 1 of 1

It is certified that error appears in the above-identified patent and that said Letters Patent is hereby corrected as shown below:

In the Claims

Column 20, Line 3:
In Claim 5, delete "$\cos(v/2)\cdot$" and insert -- $\cos(\Theta/2)\cdot$ --, therefor.

Signed and Sealed this
Twenty-fourth Day of December, 2019

Andrei Iancu
*Director of the United States Patent and Trademark Office*